Nov. 25, 1969  N. J. GARDNER ET AL  3,479,767
EMERGENCY DOOR OPENER FOR AUTOMOBILES
Filed March 11, 1968  2 Sheets-Sheet 1
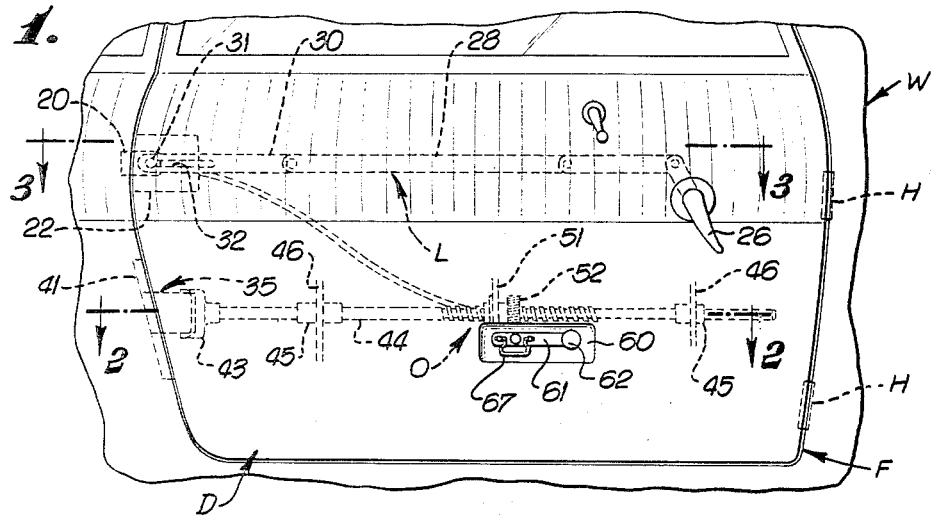
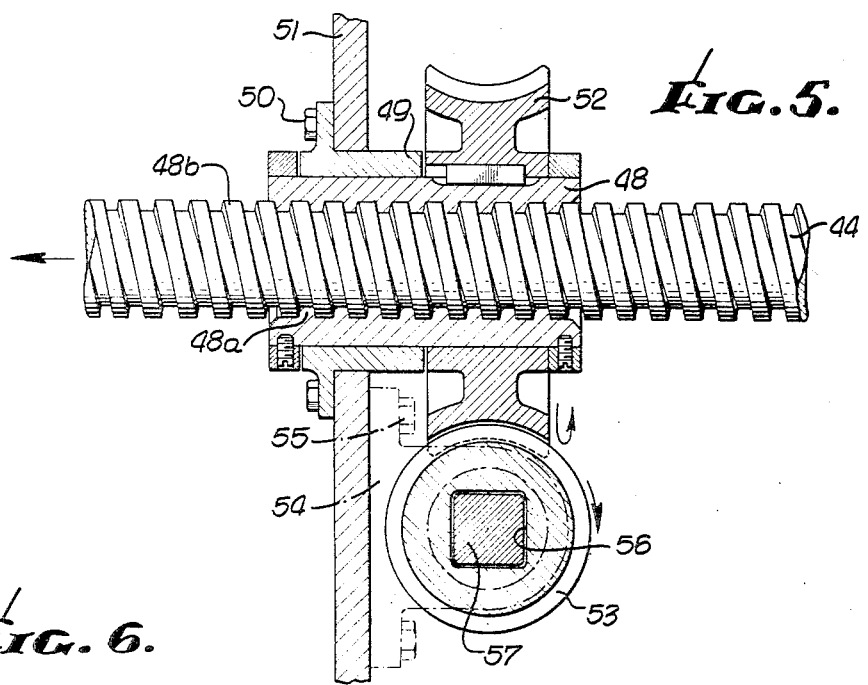
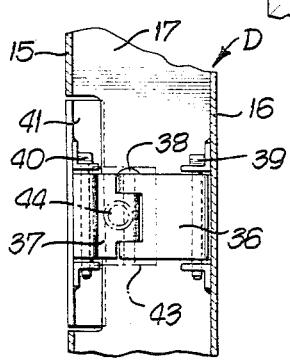
INVENTORS.
WILLIAM R. LASTINGER
NEWELL J. GARDNER
By Bernard Kriegel
ATTORNEY.

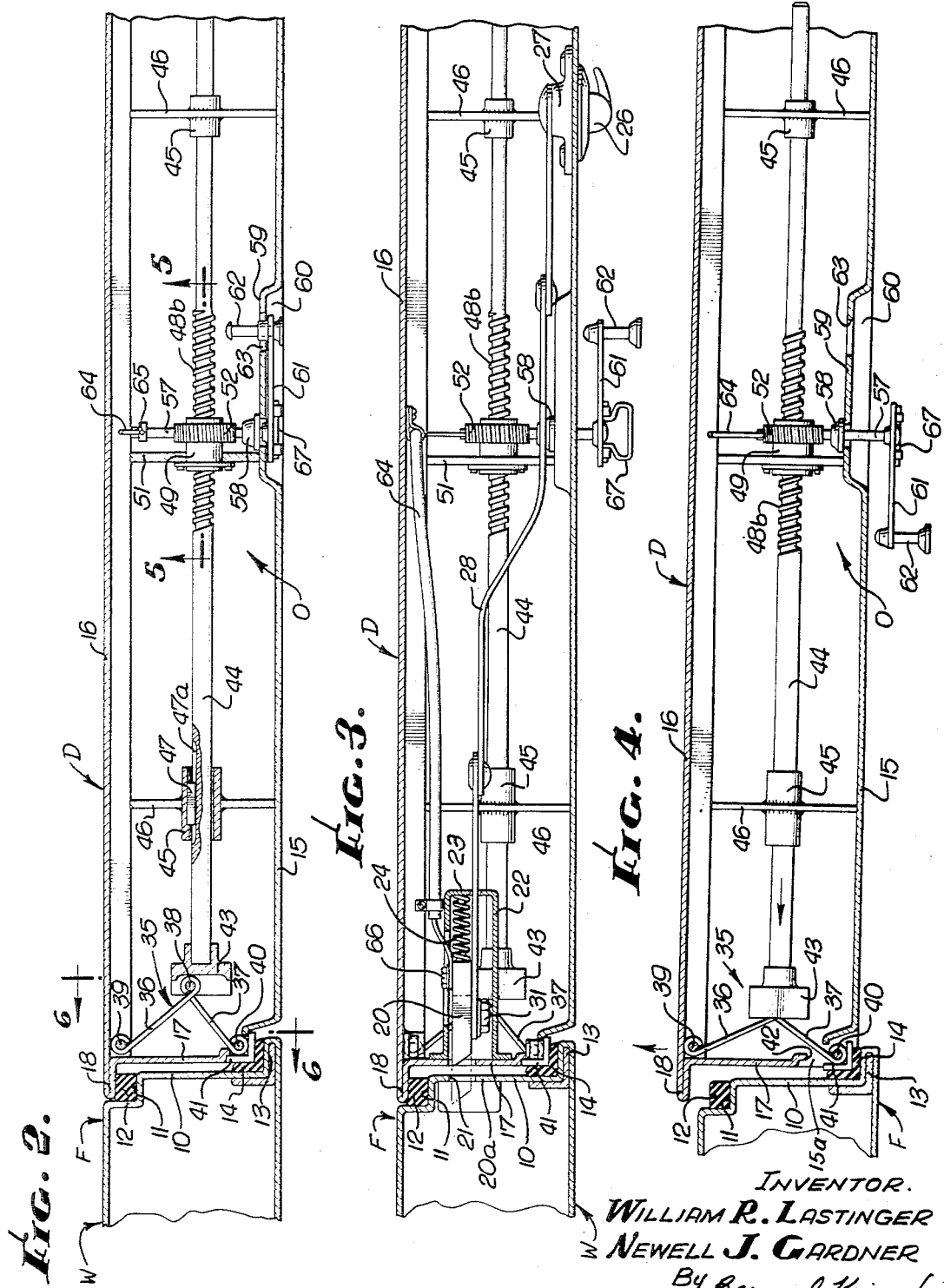

United States Patent Office 3,479,767
Patented Nov. 25, 1969

3,479,767
EMERGENCY DOOR OPENER FOR AUTOMOBILES
Newell J. Gardner, 6505 Wilshire Blvd., Los Angeles, Calif. 90048, and William R. Lastinger, Austin, Tex. (P.O. Box 75366, Los Angeles, Calif. 90005)
Filed Mar. 11, 1968, Ser. No. 714,165
Int. Cl. E05f 11/54; E05c 15/02; B60j 5/04
U.S. Cl. 49—280    16 Claims

ABSTRACT OF THE DISCLOSURE

An emergency door opener in which the usual latch is opened upon operation of the emergency opener to apply an opening force to the door of an automobile, whereby the door will be forced open in the event an accident has caused the door to be wedged closed in the frame.

---

When automotive vehicles, such as passenger automobiles, trucks, and the like, become involved in accidents, one or more of the vehicle doors might become jammed in the door frame, making it difficult, if not impossible, for an occupant of the vehicle to open the door, particularly if the occupant has been injured or is in an awkward position relative to the jammed door. Sometimes, the the jammed door may be the only possible mode of escape, as, for example, in the event the vehicle is overturned to close off one side of an escape route, the jammed door being on the upturned side. On the other hand, certain doors may be more tightly jammed or damaged than others, but for one reason or another the doors are not openable except by the application of substantial force in excess of the strength of the occupant.

Accordingly, an object of the invention is to provide a door opening mechanism for emergency use, whereby an occupant of a vehicle is mechanically assisted in opening a door which may be jammed or wedged in the frame and difficult to open.

Another object of the invention is to provide a door opening mechanism for vehicles, combined with the usual door latch operating mechanism, whereby operation of the door opening mechanism will cause release of the latch mechanism, thereby leaving the occupant free from the necessity of operating both the usual latch mechanism and the door opening mechanism.

Still another object of the invention is to provide a vehicle door opening mechanism that will apply a large opening force on the vehicle door in response to the application of a relatively small force to the operating mechanism by an occupant of the vehicle.

More specifically, an object of the invention is to provide a door mechanism which is operable to apply a large opening force to a vehicle door in response to a relatively small operating force applied by an occupant, and wherein the operating mechanism is in a normally recessed or out-of-the-way condition, but is readily accessible for operation by an occupant of the vehicle, and wherein conditioning of the operating mechanism for the opener will effect release of the usual door latch, thus avoiding the necessity of separately releasing the door latch.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a fragmentary side elevational view, showing a vehicle door and frame assembly embodying opening mechanism in accordance with the invention;

FIG. 2 is an enlarged horizontal sectional view, taken on the line 2—2 of FIG. 1, showing the door opening mechanism;

FIG. 3 is an enlarged horizontal sectional view, taken on the line 3—3 of FIG. 1, showing the relationship of the door opening mechanism and the usual door latch mechanism;

FIG. 4 is a view corresponding to FIG. 2, but showing the door partially opened by the opening mechanism;

FIG. 5 is an enlarged fragmentary vertical sectional view taken on the line 5—5 of FIG. 2; and FIG. 6 is a vertical detail sectional view taken on the line 6—6 of FIG. 2.

As illustrated in FIG. 1, the invention is applicable to a vehicle having a wall W forming a side of a passenger compartment, a door frame structure F, and a door D hinged, as at H, to swing outwardly upon release of the usual latch mechanism, generally denoted at L. In accordance with the invention, a door opening mechanism, generally denoted at O, is provided for use in an emergency to apply an opening force to the door to force it open, even though the door frame or door may have been warped due to an accident and may prevent normal opening of the door.

Referring to FIGS. 2–4, the door frame F is shown as typically including a jamb 10 which extends about and defines the door opening, the jamb 10 having an outer marginal seat 11 on which a suitable sealing gasket 12 is disposed. The jamb 10 of the frame F typically includes a flange 13 extending into the opening and forming a door stop adapted to limit closing movement of the door D. The stop flange 13 may also have a sealing strip 14 applied thereto.

The door D may typically include spaced inside and outside walls 15 and 16, respectively, and a peripheral wall 17. About the periphery of the door D is an outstanding flange 18 adapted for sealing engagement with the gasket 12 when the door is closed. At the juncture of the peripheral wall 17 and the inner wall 15 of the door, it is provided with an angular indentation or recess 15a for receiving the stop flange 13 of the frame F.

As is customary in such doors, a latch mechanism L is provided, which includes a slidable latch bar 20, seen in FIGS. 1 and 3, adapted to be automatically engaged in a latch plate portion 20a of the frame wall 10, the latch plate portion having an opening 21 for reception of the latch 20. This latch 20 may be slidably supported in a suitable bracket 22 welded, or otherwise secured, to one of the door walls and having a spring seat 23 for a latch spring 24 which normally biases the latch outwardly for latching engagement in the frame opening 21.

The usual operating means is provided for the latch 20, including a crank arm or handle 26 pivotally mounted in a support 27 mounted on the inside wall 15 of the door and connected to suitable linkage 28. This linkage includes, illustratively, a link 30 connected to the latch 20 by a screw 31 and having an elongated lost-motion slot 32, whereby the latch is free for retracting movement relative to the link 30 to allow automatic engagement of the latch 20 in the frame opening 21 upon closure of the door.

It is to be understood that the structure thus far specifically described is merely illustrative of the conventional vehicle doors and latch mechanisms therefor, it being unnecessary to further illustrate or describe such conventional structures.

As previously indicated, the opening means O of the invention is combined with the door assembly to effect unlatching of the latch 20, as well as to apply an opening force on the door of considerable magnitude. This opening means includes, in the illustrative embodiment, spreadable toggle means 35 including a pair of links 36 and 37 pivotally interconnected at their inner ends 38. The link 36 is pivoted at its other end on a pin 39 provided in the door D at the juncture of the outer wall 16 with the peripheral wall 17. The other link 37 is pivoted on a pin 40 carried by an L-shaped or angle shoe 41 adapted to fit in the marginal depression 15a in the door at the juncture of the inside wall 15 with the peripheral wall 17, the door being slotted at 42 for the passage of the link 37 therethrough. These links 36 and 37 are preferably rigid plates, as best seen in FIG. 6, to resist yielding or deformation under high door opening forces.

Means are provided for applying a force on the pivotal connection 38 of the links 36 and 37, to produce a spreading force on the links, as the shoe 41 abuts with the frame at the angular section formed between the stop flange 13 and the jamb or wall 10, and the other link 36 acts outwardly on the door D to force it open. Such means includes an annular pressure plate 43 having sliding engagement with the links at their pivotal interconnection 38. This plate is supported on and fixed to the end of a shaft 44 slidable in suitable guide bushings 45 carried by supporting plates or brackets 46 of the door. Suitable means, such as a key 47, in one of the guides 45 fitting in a shaft keyway 47a are provided to hold the shaft 44 against rotation while permitting it to move axially by operating means hereinafter to be described.

This operating means is best seen in FIG. 5 and includes an internally threaded sleeve 48 revolvably disposed in a bushing 49 fixed, as by fasteners 50, to a support plate 51 extending between the door walls 15 and 16. The sleeve has internal threads 48a in threaded engagement with external threads 48b of the shaft 44 so as to move the shaft 44 axially in response to rotation of the sleeve 48. Keyed to the sleeve 48 is a worm gear 52 engaged by a drive worm 53 journalled in a support 54 which is fixed by fasteners 55 on the plate 51 which supports the bushing 49 for the screw sleeve 48.

In order to effect rotation of the worm 53, it is provided with a polygonal opening 56 in which is slidably disposed a drive shaft 57 of similar cross-sectional form. This shaft 57 extends horizontally through a bearing 58 supported on an inner wall 59 of a recessed compartment 60 in the inside wall 15 of the door, the shaft being axially slidable through the bearing 58 and through the opening 56 of the worm 53. On its outer extremity, the shaft 57 is provided with a crank arm 61 having a handle 62 at its free end, by means of which the shaft may be rotated. This handle 62 is shiftably supported in the lever arm 61 so as to be moved between an inner position extending through an opening 63 in the compartment wall 59 and an outer operative position at which it may be conveniently gripped to effect rotation of the shaft 57.

Means are provided for effecting reelase of the latch 20 when the shaft 57 and the crank arm 61 are moved from their recessed position shown in FIG. 2 to their outer, operative position shown in FIGS. 3 and 4. In the illustrative embodiment, such means comprises a flexible cable or "Bowden" wire 64 connected at 65 to the inner end of the shaft 57 and to the latch 20 at 66. In order to facilitate application of sufficient pull on the cable or wire 64 to overcome the latch spring 24, a pull member 67 is pivotally connected to the crank arm 61 for movement to an out-of-the-way or pendant position, when not in use, within the recessed compartment 60, but which may be swung outwardly to pull the handle 62 from the compartment 60 and also to pull the wire 64 and retract the latch 20.

In the use of the invention, it will now be understood that the door D may be forcibly opened even though it may be wedged in the frame F. More particularly, when it is desired to open the door, an occupant may grasp the pull 67 and pull outwardly thereon, the shaft 57 sliding through the worm 53, and the flexible cable or wire 64 causing the latch 20 to be retracted. Thereupon, the crank arm 61 may be rotated to rotate the worm 53 and gear 52, causing the shaft 44 to shift longitudinally in the direction shown by the arrow in FIG. 5. Such operation, as seen in FIG. 4, will force the pivot 38 of the links 36 and 37 to the left, causing the spreading apart of the pivots 39 and 40, the shoe 41 being forced against the door frame F, and the link 36 acting against the door D to force the door open. The gearing and the screen feed provide substantial mechanical advantage, so that the opening force applied to the door is many times the force applied to the crank 61.

We claim:

1. In apparatus for opening a vehicle door by applying a force to the door to move it from the door frame, said vehicle door being hinged at one side to the door frame and having a latch at its opposite side for releasably securing the door to the frame in closed position: force applying means interengageable with the frame and door at the latch side of the door and operable to apply a spreading force therebetween to open the door, and operating means carried by said door for operating said force applying means.

2. Apparatus as defined in claim 1, wherein said force applying means includes toggle link means having a link engaged with said door at its latch side and a link engageable with the frame at the latch side of the door.

3. In apparatus for opening a vehicle door by applying a force to the door to move it from the door frame: force applying means interengageable with the frame and door and operable to apply a spreading force therebetween, and operating means carried by said door for operating said force applying means, wherein said force applying means includes a first link having one end pivotally connected to said door, another link having one end engageable with said frame, said links being pivotally interconnected at their other ends, and said operating means includes means for applying force to said other ends of said links to spread the first-mentioned ends of said links.

4. In apparatus for opening a vehicle door by applying a force to the door to move it from the door frame: force applying means interengageable with the frame and door and operable to apply a spreading force therebetween, and operating means carried by said door for operating said force applying means, wherein said force applying means includes a first link having one end engaged with said door, another link having one end provided with a shoe engageable with said frame, and said operating means includes means operably engaged with the other ends of said links for applying force thereto to spread the first-mentioned ends of said links.

5. Apparatus as defined in claim 1, wherein said operating means includes a crank carried by said door, and gear means interposed between said crank and said force applying means and providing a mechanical advantage in the opening of said door.

6. Apparatus as defined in claim 1, wherein said operating means includes means for releasing said latch.

7. Apparatus as defined in claim 1, wherein said operating means includes a member shiftably carried by said door for movement from an inoperative position to an operative position, and interconnected between said member and said latch means for releasing said latch responsive to movement of said member to said operative position.

8. Apparatus as defined in claim 1, wherein said operating means includes a member shiftably carried by said door for movement from an inoperative position to an operative position, means interconnected between said member and said latch for releasing said latch responsive to movement of said member to said operative position, and manually operable means carried by said member for moving said member to said operative position.

9. Apparatus as defined in claim 1, wherein said force applying means includes link means engaged with said frame and said door, and said operating means being engaged with said link means to spread the same and including a lever arm revolvably supported on said door, a longitudinally movable member engaged with said link means, and means drivable by said lever arm and engaged with said longitudinally movable member to move the same upon rotation of said lever arm.

10. Apparatus as defined in claim 1, wherein said force applying means includes link means engaged with said frame and said door, and said operating means being engaged with said link means to spread the same and including a lever arm revolvably supported in said door, a longitudinally movable member engaged with said link means, and means drivable by said lever arm and engaged with said longitudinally movable member to move the same upon rotation of said lever arm, including gear means driven by said crank arm, and screw means rotatable by said gear means and engaged with said longitudinally movable member.

11. In apparatus for opening a vehicle door by applying a force to the door to move it from the door frame: force applying means interengageable with the frame and door and operable to apply a spreading force therebetween, and operating means carried by said door for operating said force applying means, wherein said force applying means includes link means engaged with said frame and said door, and said operating means being engaged with said link means to spread the same to force said door open and including a lever arm revolvably supported in said door, a longitudinally movable member engaged with said link means, means drivable by said lever arm and engaged with said longitudinally movable member to move the same upon rotation of said lever arm including gear means driven by said crank arm, screw means rotatable by said gear means and engaged with said longitudinally movable member, and drive means connected to said lever arm and slidably engaging said gear means for enabling movement of said lever arm between first and second positions, said door having a depression receiving said lever arm when said lever arm is in said first position.

12. Apparatus as defined in claim 11, wherein said lever arm has an operating handle, said handle being movable between first and second positions, and said door having an opening receiving said handle when said handle is in said first position.

13. Apparatus as defined in claim 11, wherein said screw means is threadedly engaged with said longitudinally movable member, said door and said frame having normally engaged latch means, and means for releasing said latch means upon movement of said lever arm to said second position.

14. Apparatus as defined in claim 11, wherein said screw means is threadedly engaged with said longitudinally movable member, said door and said frame having normally engaged latch means, and means interconnected with said drive means and with said latch means for releasing said latch means upon movement of said lever arm to said second position.

15. In apparatus for opening a vehicle door to move it from the door frame by applying a force between the door and the frame, said door and said frame having latch means normally latching said door closed, and operating means for said latch means, a pair of toggle links in said door, one of said links being engaged at one end with said door, the other of said links extending at one end through said door and having a shoe engageable with said door frame, a pressure member engaged with the other ends of said links, a longitudinally movable member in said door engaged with said pressure member to move the same in a direction to spread said links and apply said force between said door and said frame, drive means in said door for moving said longitudinally movable member, operating means for said drive means, and means interconnected with said latch means and said operating means for said drive means for releasing said latch means upon operation of said operating means for said drive means.

16. Apparatus as defined in claim 15, wherein said latch means includes a latch member carried by said door, spring means normally biasing said latch member to a latching position, means including a lost-motion connection between said operating means for said latch means and said latch member, and said means interconnected between said operating means for said drive means and said latch means includes a flexible element connected to said latch member.

References Cited

UNITED STATES PATENTS

| | | | |
|---|---|---|---|
| 1,614,255 | 1/1927 | Philbin | 49—358 X |
| 3,069,151 | 12/1962 | Cook et al. | 49—280 |
| 3,124,344 | 3/1964 | Mano | 49—280 |
| 3,344,554 | 10/1967 | Misaka et al. | 49—280 |
| 3,398,484 | 8/1968 | Katsumera et al. | 49—340 X |

DAVID J. WILLIAMOWSKY, Primary Examiner

J. KARL BELL, Assistant Examiner

U.S. Cl. X.R.

49—141, 300, 340, 358; 180—112